Jan. 12, 1960   R. S. NORTON   2,921,255
APPARATUS FOR INDICATING THE NUMBER OF TURNS
OF AN ELECTRICAL COIL
Filed Oct. 11, 1954   2 Sheets-Sheet 2
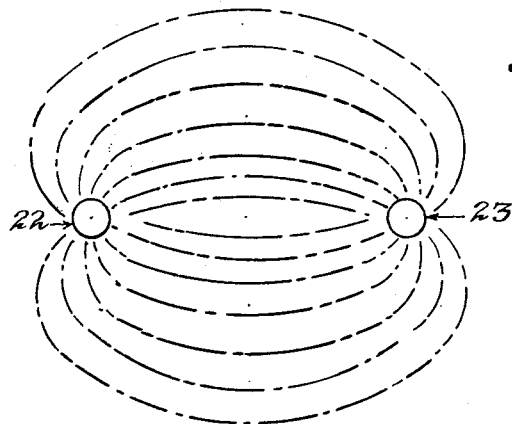
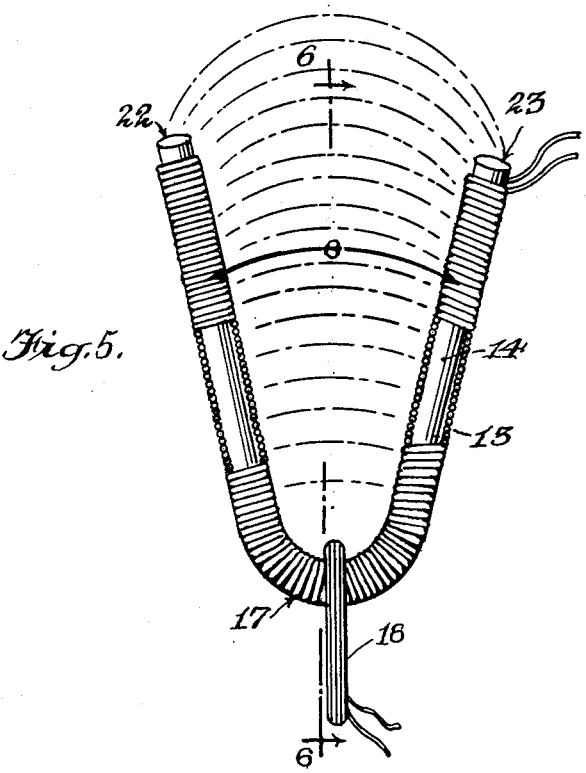
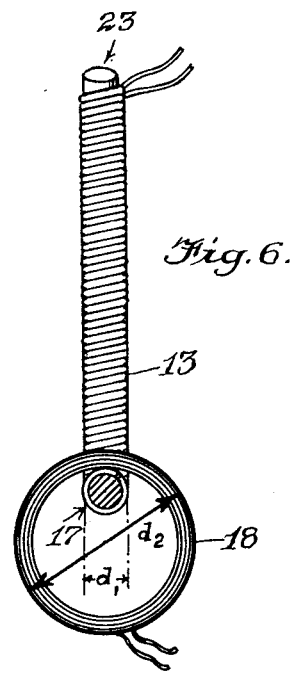
INVENTOR
Ralph S. Norton
BY
Munn, Liddy, Nathanson & March
ATTORNEYS United States Patent Office 2,921,255
Patented Jan. 12, 1960

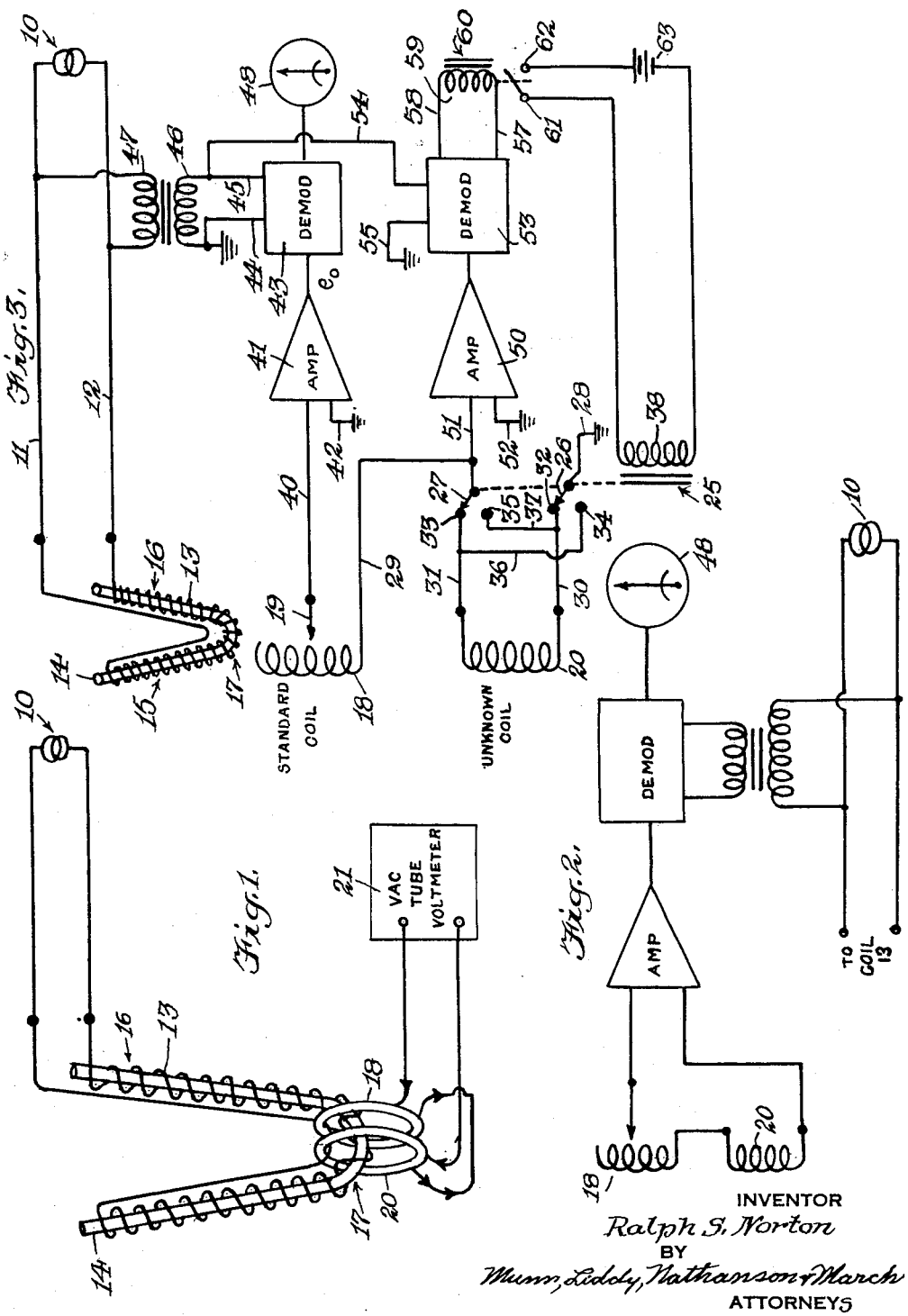

2,921,255
APPARATUS FOR INDICATING THE NUMBER OF TURNS OF AN ELECTRICAL COIL

Ralph S. Norton, Roseland, N.J., assignor, by mesne assignments, to McGraw-Edison Company, Elgin, Ill., a corporation of Delaware Application October 11, 1954, Serial No. 461,631
10 Claims. (Cl. 324—34)

This invention relates to methods and apparatus for indicating or determining electrically the number of turns of an electrical coil assembly.

An object of the invention is to provide an improved electrical apparatus for indicating or determining the number of turns of a coil assembly, which apparatus enables the determination or count to be made with great accuracy.

Another object of the invention is to provide an improved turn-measuring apparatus as above set forth, which is extremely easy to operate and rapid in its determination of the number of turns of the coil.

A further object of the invention is to provide an improved apparatus in accordance with the foregoing, which may be made up of relatively inexpensive components while yet maintaining great ease and accuracy in its operation.

A feature of the invention resides in the provision of an improved apparatus as above characterized, which does not require a skilled operator in order to obtain the information or measurement.

A still further object of the invention is to provide a novel and improved method for indicating or measuring electrically the number of turns of a coil assembly whether the coil assembly is self supporting or consists of windings on a metallic or other electrically conducting bobbin.

Yet another object of the invention is to provide a turn-measuring apparatus arranged to subject a coil assembly to a fluctuating flux, wherein the diameter and the positioning of the coil in the apparatus are not particularly critical and do not appreciably affect the accuracy of the readings.

A further and important feature of the invention resides in the provision of a measuring apparatus which subjects the unknown coil assembly to a fluctuating flux while the coil assembly is connected in a circuit, and which automatically reverses the coil assembly connections if the coil assembly is not initially connected to effect proper phasing of its induced voltage.

Other features and advantages will hereinafter appear.

In the accompanying drawings:

Figure 1 is a diagrammatic representation of a portion of the apparatus, with which the coil assembly of unknown number of turns is to be associated;

Fig. 2 is a schematic diagram of a portion of the apparatus connected with the coil assembly of unknown number of turns, by which determinations may be made regarding the number of turns;

Fig. 3 is a schematic diagram illustrating a complete apparatus embodying the invention;

Fig. 4 is a flux diagram showing the lines of force about the poles of a flux-producing means of the apparatus;

Fig. 5 is a diagrammatic view showing the flux producing means of Fig. 4 in side elevation and accommodating an inductively-coupled coil in which a voltage is induced; and Fig. 6 is a sectional view taken on line 6—6 of Fig. 5.

Referring to Fig. 3, the improved apparatus of this invention comprises a source of alternating current 10 connected by wires 11 and 12 to an elongate coil 13 having a magnetic core 14 by which a fluctuating flux or field is produced. The coil 13 and core 14 have coextensive leg portions indicated generally by the numerals 15 and 16, and have yoke portions 17 connecting together corresponding parts of the leg portions 15 and 16. The coil 13 and core 14 may conveniently be formed in the shape of a U or broad-bottomed V, as shown.

Disposed around and linking the yoke portions 17 of the coil 13 and core 14 is a variable standard or reference coil 18, Figs. 1, 3 and 5, the coil 18 having a variable number of turns which are known at any time, the varying means being indicated diagrammatically in Fig. 3 by a contact arm 19. In this connection it will be understood that the coil 18 may be provided with a plurality of taps connected to a tap switch of large capacity, whereby the effective number of turns of the coil 18 may be varied and known, between wide limits.

The coil 13 and core 14 are arranged to accommodate on the yoke portions 17 thereof, in linking relation thereto and closely juxtaposed to the reference coil 18 any of various coil assemblies or coils 20 whose turns are unknown and are to be indicated or measured. The juxtaposed positions of the coils 18 and 20 may be as indicated in Fig. 1.

It will be appreciated that, with the coil 13 energized with alternating current, a fluctuating flux will be created which links both of the coils 18 and 20, and if these coils are connected in series but with their induced voltages opposing, as indicated in Fig. 1, a resultant voltage of zero would be produced when the coils have an equal number of turns. The zero voltage may be indicated by a sensitive voltmeter, such as the vacuum tube voltmeter 21 shown in Fig. 1.

To obtain accuracy by the method and apparatus of this invention, involving determinations of induced voltages proportional to the turns of the coils, it is essential that a common, uniform linking flux be provided for both coils, the flux linking one coil having exactly the same strength as the flux linking the other coil.

If the coils 18 and 20 were made to link a toroid, there would be assurance that the flux linking the coils would be the same. However, the use of a toroid would be impractical because of the necessity for applying and removing the coil 20 of unknown number of turns before and after the determination or measurement has been made. As provided by the present invention, essentially the same flux may be made to link both the coils 18 and 20 by the use of the coil 13 and core 14, as shown. For example, referring to Figs. 4 and 5, it will be seen that the flux density in the air is greatest in the zone adjacent the poles 22 and 23 of the core 14. In the area of the yoke portions 17 of the coil 13 and core 14 very little leakage flux exists, as indicated by the few number of lines of Fig. 5. Virtually no leakage flux exists below the yoke portions 17, as indicated by the absence of lines in Fig. 5. Use is made of this, according to the invention, to insure that both of the coils 18 and 20 are linked by the same total flux lines. Considering Figs. 5 and 6, it should be noted that the relative diameters of the coils 13, 18 and 20 are not especially critical, since where the coils 18 and 20 may extend appreciably below the bottom of the yoke portions 17, as indicated, they would not change the total value of flux linking the coils. This is due to the absence of leakage flux in the zone below the yoke portions, caused by the long, high-reluctance paths the flux would have to follow to be present in this zone.

I have found that, over a finite portion of the yokes 17, essentially constant flux density exists within the coil 13, and therefore the total flux through the coils 18 and 20 will be the same for several different positions of these coils. I have discovered that the leg portions 15 and 16 need not be parallel to obtain this condition, but that in practice the included angle between the leg portions may vary from zero degrees to 90 degrees. I provide the V or U-shape of the coil 13 and core 14 in order to create a preferred return path for the magnetic flux outside of and above the coil, thereby to provide a region (below the yokes 17) where the field strength will be extremely weak.

Referring to the voltage-measuring circuit of Fig. 1, due to the unique shape of the coil 13 and core 14 the coils 18 and 20 may be physically separated to some extent without appreciably changing the flux linking these coils, and therefore they are not what I term "position sensitive." Also, because of the absence of flux below the yoke portions 17, the coils 18 and 20 if appreciably larger in diameter than the coil 18 may hang on the yoke portions and thereby take advantage of the absence of flux in the zone below the yoke portions. Such arrangement would not appreciably change the flux linking one coil and the other, and accordingly the coils 18 and 20 would not be what I term "diameter sensitive." If, instead of using the V or U-shape for the coil 13 and core 14 a straight, long magnet were used, the coils 18 and 20 would be both "position sensitive" and "diameter sensitive," and such arrangement would defeat any efforts to obtain accurate readings or indications by virtue of the induced voltages of the coils.

Referring again to Fig. 3, I utilize the induced voltages of the coils 18 and 20, in conjunction with known values of the effective turns of the coil 18 to provide an accurate measurement of the number of turns in the coil 20. In conjunction with such measurement I obtain indications as to whether the turns of the coil 20 are greater or less than the turns of the coil 18 for a given setting of the latter, thereby facilitating adjustment of the apparatus to quickly produce the desired readings.

I also enable the coil 20 to be connected in the circuit of the apparatus without regard to the phasing of the induced voltages thereof, and accomplish this by the provision of automatic means which reverses the connections of the coil when such is necessary to obtain the proper reading.

In accomplishing this latter, I provide an electrical relay 25 of the double-pole, double-throw type, having contact arms 26 and 27 connected respectively to a ground 28 and a wire 29 leading to one end of the coil 18. The ends of the coil 20 are connected by wires 30 and 31 to relay contacts 32 and 33 respectively, and relay contacts 34 and 35 are connected by jumpers 36 and 37 to the contacts 33 and 32 respectively. The relay 25 is of the mechanical latching type, being so constructed that momentary excitation of its coil 38 will cause the contact blades 26 and 27 to move to their alternate position and to remain there despite de-energization of the coil. A subsequent pulse supplied to the relay coil 38 will thereafter return the contacts 26 and 27 to their first positions, and so on. With this arrangement the coil 20 of unknown number of turns may be series connected to the coil 18 of known number of turns in either of opposite ways, merely by actuation of the latching relay 25, thereby to cause the induced voltages of the coils to be either in phase or in phase opposition, that is, adding or subtracting.

With the apparatus of the present invention, it is desired to have the coils 18 and 20 connected in phase opposition, so that their induced voltages subtract, and the means provided by the invention for automatically effecting such connection regardless of how the coil 20 is initially connected to the apparatus will be described in detail later.

Assuming that the coils 18 and 20 are connected so that their induced voltages are in phase opposition, regulation of the turn adjustment 19 of the coil 18 may be made to effect equality of the turns of the coils whereby the induced voltages will cancel each other. I utilize this effect to obtain an accurate reading or measurement of the number of turns of the coil 20.

As shown in Fig. 3, the adjustment 19 is connected by a wire 40 to an amplifier 41 whose input is also connected by a wire 42 to ground. The output of the amplifier 41 is brought to a demodulator 43 which has the ability to change alternating current to D.C. pulses. The demodulator 43 is also supplied with a reference voltage through wires 44 and 45 connected to a transformer secondary coil 46, the primary coil 47 of the transformer being energized from the current source 10. The output of the demodulator is impressed on a D.C. meter 48 which has a zero center characteristic.

The demodulator 43 is balanced so that when there is no input from the amplifier 41 the reference voltage from the transformer secondary coil 46 will cause zero or center scale deflection of the meter 48. When the amplifier 41 delivers an alternating voltage which is in phase with the voltage of the transformer secondary 46, the pointer of the meter 48 will deflect in one direction, and when the amplifier 41 delivers a voltage which is in phase opposition to the voltage of the transformer secondary 46 the pointer of the meter 48 will be deflected in the opposite direction.

It will be thus understood that, with the above organization, if the adjustment 19 of the coil 18 is varied to cause zero voltage in the output of the amplifier 41, the meter will indicate zero or center scale. However, for such condition, since the induced voltages of the coils 18 and 20 oppose each other the values of said induced voltages and of the number of effective turns of the two coils must be exactly equal. By providing the adjustment 19 with a scale whereby the exact number of turns will be known for any setting of the adjustment, an operator may quickly ascertain the number of turns of the unknown coil 20, since this will be the reading of the adjustment 19.

Moreover, the portions of the scale of the meter 48 on opposite sides of the zero center may be labeled "high" and "low," thus indicating that the turns of the unknown coil 20 are either more or less than the effective number of turns of the reference coil 18 as determined by the setting of the adjustment 19.

By the present invention I provide means for automatically energizing the relay 25 in the event that the unknown coil 20 is initially connected to the apparatus so as to be not in opposition to the coil 18. This means comprises an amplifier 50 whose input is connected by a wire 51 to the wire 29, and by a wire 52 to ground. The amplifier 50 feeds a demodulator 53 which is also supplied with a reference voltage from the transformer secondary coil 46, by means of a wire 54 and a ground wire 55. The wire 44 of the transformer secondary coil 46 is also grounded as shown. The output of the demodulator 53 is connected by wires 57 and 58 to the coil 59 of the polarized relay 60 having contacts 61 and 62 connected in circuit with a battery 63 and the coil 38 of the relay 25.

Since the coil 20 receives its induced voltage from the source 10, and since the demodulator 53 receives its reference voltage from the same source 10, it will be seen that the induced voltage of the coil 20 may be either in phase with or in phase opposition with the reference voltage. For these two possibilities, and with the demodulator 53 balanced as explained in connection with the demodulator 43, the polarized relay 60 may be made to operate only when the induced voltage in the coil 20 is in phase with the reference voltage. Such operation of the relay 60 will cause the relay 25 to switch the connections of the coil 20 whereby the induced voltage of the coil will be placed in phase opposition to the reference voltage of the demodulator 53, and also in phase opposition to the induced voltage of the coil 18. For such connection of the coil 20, the polarized relay 60 will not be energized. Therefore, if the coil 20 is initially connected to the apparatus so as to oppose with its voltage the voltage of the coil 18, the connections existing and as established by the relay 25 will remain unchanged, the polarized relay 60 remaining inoperative. If, however, the coil 20 is initially connected in the reverse, that is, with its voltage in phase with the induced voltage of the coil 18, the polarized relay coil 60 will be caused to operate and switch the connections of the coil 20 so as to effect a reversal thereof.

A simplified circuit illustrating the turn indicating or measuring portion of the apparatus of Fig. 3 is shown in Fig. 2. Parts or components which are identical in the two figures have been given like characters. In Fig. 2 the coils 18 and 20 are shown as connected in series opposition without the interposition in the circuit of the reversing relay 25.

I have found that by the above organization an extremely accurate determination of the number of turns of the unknown coil 20 may be had. Since the unknown coil is connected in opposition to the standard coil 18 and the differences of the induced voltages utilized, the same observable sensitivity is exhibited to error independent of the number of turns under test i.e., a one turn error in ten turns will cause the same meter deflection as a one turn error in two hundred turns. If the error due to the fringing of the magnetic flux in the zone below the yokes 17 is to be less than the effect of an error of one turn at the highest number of turns to be tested, the maxamum allowable return or fringing flux $\phi_f$ which can be permitted to intersect the coil 18, is $$\phi_f < \frac{\phi_t}{N}$$

where N equals maximum number of turns to be measured and $\phi_t$ equals the maximum total flux in the coil 13. Therefore, the maximum average value of flux density $B_f$ in the region below the yokes 17 must be $$B_f < \left(\frac{d_1}{d_2}\right)^2 \frac{B_m}{N}$$

where $B_m$ equals maximum flux density in coil 13.
$d_1$ equals diameter of coil 13.
$d_2$ equals maximum diameter of coil 20 to be tested.

This is also an implied limitation on the maximum ratio of diameters of the "unkown" and "standard" coils in the above described circuit. Since $B_f$ is not a function of the coil 20 under test, the accuracy proportionally improves as the number of turns measured is decreased. Therefore, in a device of this type it is quite correct to express the accuracy as a percentage of actual value being measured, rather than as a percentage of any full scale range of the equipment.

While I have disclosed and described herein a preferred embodiment of the invention, it should be understood that the invention is not limited to this specific description and disclosure, and variations and modifications may be made within the scope of the claims and portions of the improvements may be used without others.

I claim:

1. Apparatus for indicating the number of turns of an electrical coil assembly, comprising an elongate coil of relatively small diameter, energized with a fluctuating current and having a magnetic core, said energized coil and core having coextensive leg portions and also a yoke portion connecting one pair of corresponding ends of said leg portions, the other pair of leg portions being free and unconnected by any magnetic material and causing a large leakage flux; and a variable reference coil having a known, variable number of turns, disposed around and linking the yoke portion of the elongate coil and core, said energized coil and core being arranged to accommodate, on their yoke portions in linking relation thereto and closely juxtaposed to the reference coil, the coil assembly whose turns are to be indicated whereby substantially the same fluctuating flux links both the reference coil and the coil assembly and induces the same voltage per turn in both.

2. The invention as defined in claim 1 in which the coil and core are substantially in the shape of a U.

3. The invention as defined in claim 2 in which the leg portions are divergent.

4. The invention as defined in claim 2 in which the leg portions extend at an included angle of between zero degrees and 90 degrees.

5. The invention as defined in claim 1 in which the coil is wound directly on and insulated from the core.

6. The invention as defined in claim 1 in which the reference coil has an appreciably greater diameter than the energized coil, constituting a multiple of the diameter of the energized coil, said reference coil being eccentrically disposed in the latter with one side juxtaposed to the inner part of the yoke portion of the energized coil.

7. Apparatus for indicating the number of turns of an electrical coil assembly, comprising in addition to said coil assembly a reference coil adapted to be disposed in close inductive relation to the coil assembly, said coil and said coil assembly being connected in series opposition; means linking said coil and coil assembly with substantially the same fluctuating flux, providing opposed induced alternating voltages therein; an amplifier connected with said coil and coil assembly, for amplifying the difference of the induced voltages; a demodulator for changing an A.C. voltage to a D.C. voltage, said demodulator being connected to the output of the amplifier; a reversibly deflectable D.C. meter in the output circuit of the demodulator, having a normal indicating position intermediate the ends of the scale; means impressing an A.C. voltage of the same frequency as the induced coil and coil assembly voltages and in phase opposition to one of said voltages on said demodulator whereby when the said voltage difference is in phase with the impressed voltage the meter will indicate in one direction from normal, and when the voltage difference is in phase opposition to the impressed voltage the meter will indicate in the opposite direction from normal; and means automatically reversing the series connection of the coil assembly if the coil assembly should be initially connected with its voltages adding to instead of subtracting from that of the reference coil.

8. The invention as defined in claim 7 in which the automatic reversing means is actuated by the induced voltage of the said coil assembly whose connections are reversed.

9. The invention as defined in claim 8 in which the reversing means includes a polarized relay and means responsive to the phase position of said induced voltage, actuating said relay when the phase position is the same as that of the induced voltage in the reference coil.

10. The invention as defined in claim 9 in which the means responsive to the phase position includes a second demodulator, and means impressing an A.C. voltage on the second demodulator having the same frequency and phase as the A.C. voltage impressed on the first-mentioned demodulator.

References Cited in the file of this patent

UNITED STATES PATENTS

| | | |
|---|---|---|
| Re. 21,003 | Knerr et al. | Feb. 14, 1939 |
| 1,588,539 | Fortescue | June 15, 1926 |
| 1,743,318 | Carrington | Jan. 14, 1930 |
| 2,338,732 | Nosker | Jan. 11, 1944 |
| 2,432,948 | Thompson | Dec. 16, 1947 |
| 2,481,282 | Bialous | Sept. 6, 1949 |
| 2,788,486 | Guggi | Apr. 9, 1957 |